United States Patent
Heisele et al.

(10) Patent No.: US 7,680,748 B2
(45) Date of Patent: Mar. 16, 2010

(54) CREATING A MODEL TREE USING GROUP TOKENS FOR IDENTIFYING OBJECTS IN AN IMAGE

(75) Inventors: Bernd Heisele, Cambridge, MA (US); Yoav Sharon, Rehovot (IL)

(73) Assignee: Honda Motor Co., Ltd., Tokyo (JP)

( * ) Notice: Subject to any disclaimer, the term of this patent is extended or adjusted under 35 U.S.C. 154(b) by 321 days.

(21) Appl. No.: 11/347,422

(22) Filed: Feb. 2, 2006

(65) Prior Publication Data
US 2007/0179918 A1    Aug. 2, 2007

(51) Int. Cl.
*G06N 7/00* (2006.01)
*G06N 1/00* (2006.01)

(52) U.S. Cl. .................. 706/13; 706/20; 706/12

(58) Field of Classification Search ............. 706/13, 706/20, 12; 382/229, 187, 181
See application file for complete search history.

(56) References Cited

U.S. PATENT DOCUMENTS

| | | | |
|---|---|---|---|
| 6,035,057 A | | 3/2000 | Hoffman |
| 6,466,695 B1 | | 10/2002 | Potzsch et al. |
| 7,106,901 B2 | * | 9/2006 | de Queiroz ............... 382/176 |
| 2004/0042661 A1 | | 3/2004 | Ulrich et al. |
| 2005/0047647 A1 | | 3/2005 | Rutishauser et al. |

FOREIGN PATENT DOCUMENTS

GB    2409088 A    6/2005

OTHER PUBLICATIONS

Heisele et al., Bernd, "Hierarchical Classification and Feature Reduction for Fast Face Detection with Support Vector Machines", Pattern Recognition 36, 2003.*
Bernd Heisele, "Visual Object Recognition with Supervised Learning", IEEE, 2003.*
Hiesele et al., Bernd, "Face Recognition with Support Vector Machines: Global versus Component-based Approach", IEEE, 2001.*
Hiesele et al., Bernd, "Feature Reduction and Hierarchy of Classifiers for Fast Object Detection in Video Images", IEEE, 2001.*

(Continued)

*Primary Examiner*—David R Vincent
*Assistant Examiner*—Adrian L Kennedy
(74) *Attorney, Agent, or Firm*—Fenwick & West LLP; Mark E. Duell

(57) ABSTRACT

Object recognition techniques are disclosed that provide both accuracy and speed. One embodiment of the present invention is an identification system. The system is capable of locating objects in images by searching for local features of an object. The system can operate in real-time. The system is trained from a set of images of an object or objects. The system computes interest points in the training images, and then extracts local image features (tokens) around these interest points. The set of tokens from the training images is then used to build a hierarchical model structure. During identification/detection, the system, computes interest points from incoming target images. The system matches tokens around these interest points with the tokens in the hierarchical model. Each successfully matched image token votes for an object hypothesis at a certain scale, location, and orientation in the target image. Object hypotheses that receive insufficient votes are rejected.

20 Claims, 6 Drawing Sheets

OTHER PUBLICATIONS

Dolan et al., John, "Computing Curvilinear Structure by Token-based Grouping", IEEE, 1992.*

Glazer, Frank, "Fiber Identification in Microscopy by Ridge Detection and Grouping", IEEE, 1992.*

Dreschler-Fischer, Leonie, "Feature Selection in Colour Images for Token Matching", 2000.*

Fei-Fei, L. et al., "A Bayesian Approach to Unsupervised One-Shot Learning of Object Categories," [online] [Retrieved on May 15, 2006] Retrieved from the Internet<URL:http://www.vision.caltech.edu/feifeili/Fei-Fei_ICCV03.pdf>, 8 pages.

Fei-Fei, L. et al., "Learning Generative Visual Models from Few Training Examples: An Incremental Bayesian Approach Tested on 101 Object Categories," [online] [Retrieved on May 15, 2006] Retrieved from the Internet<URL:http://www.vision.caltech.edu/feifeili/Fei-Fei_GMBV04.pdf>, pp. 1-9.

Kumar, S., "Models for Learning Spatial Interactions in Natural Images for Context-Based Classification," Thesis for Degree of Doctor of Philosophy, Carnegie Mellon University, Aug. 2005, pp. 192 pages.

Lowe, D.G., "Distinctive Image Features from Scale-Invariant Keypoints," Accepted for publication in the International Journal of Computer Vision, 2004, pp. 91-110, vol. 60.

Lowe, D.G., "Object Recognition from Local Scale-Invariant Features," Proc. Of the International Conference on Computer Vision, Corfu, Sep. 1999, pp. 1-8.

Pfeiffer, M., "Unsupervised Learning of Visual Object Categories," [online] [Retrieved on May 15, 2006] Retrieved from the Internet<URL:http://www.igi.tugraz.at/pfeiffer/documents/UnsupervisedObjectClassRecognition.pdf>, 51 pages.

"Publications by David Lowe," [online] [Retrieved on May 15, 2006] Retrieved from the Internet<URL:http://www.cs.ubc.ca/spider/lowe/pubs.html>, 6 pages.

Sudderth, E.B. et al., "Learning Hierarchical Models of Scenes, Objects and Parts," Proceedings of the 2005 IEEE International Conference on Computer Vision, Oct. 2005, pp. 1331-1338, Vol. II.

Torralba, A. et al., "Sharing Visual Features for Multiclass and Multiview Object Detection," May 12, 2005, [online] [Retrieved on May 15, 2006] Retrieved from the Internet<URL: http://www.cs.ubc.ca/~murphyk/Papers/jointBoostPAMI05_submitted.pdf>, 35 pages.

Walther, D. et al., "Selective Visual Attention Enables Learning and Recognition of Multiple Objects in Cluttered Scenes," Computer Vision and Image Understanding, 2005, pp. 41-63, vol. 100.

PCT International Search Report and Written Opinion, PCT/US07/61522, Oct. 21, 2008, 10 Pages.

* cited by examiner

CREATING A MODEL TREE USING GROUP TOKENS FOR IDENTIFYING OBJECTS IN AN IMAGE

FIELD OF THE INVENTION

The invention relates to object recognition, and more particularly, to a hierarchical system for object recognition in images, such as video and photographs.

BACKGROUND OF THE INVENTION

Object recognition describes the task of automatically recognizing objects in digital video images. It can be divided into two sub tasks: detection and identification. In detection, objects belonging to a certain class (e.g., the class of cars or faces) have to be located in a given input image. In identification, a certain object has to be recognized in an image (e.g., Jim's face or Helen's blouse).

There are three main problems in object recognition. In case of detection, objects belonging to the same class might vary in their shapes and colors (e.g., different types of chairs). In case of identification, two different objects might look very similar (e.g., in face identification, the faces of siblings might be hard to distinguish). Thirdly, the appearance of an object in an image changes with its pose, the illumination, and the camera. Recognition systems have to be invariant to those changes.

In addition to these inherent problems, many conventional recognition systems suffer from a number of drawbacks. For instance, such convention systems typically require a large database of training pictures, which is tedious to build. In addition, they are too slow to be used in real-time applications. In this sense, object recognition systems can be evaluated using two main criteria: accuracy and speed. The recognition accuracy is defined by how well the system can locate objects in an image relative to the number of false alarms). The speed of the system at run-time defines how much time it takes to process a new image.

What is needed, therefore, are object recognition techniques that provide both accuracy and speed (e.g., without requiring a large database of training images and enabling real-time processing).

SUMMARY OF THE INVENTION

One embodiment of the present invention provides a method for identifying objects in images. The method includes computing one or more interest points in each of a plurality of training images including one or more objects, and extracting tokens associated with the interest points. The method continues with comparing tokens of training image pairs to find matched tokens, grouping the matched tokens into groups, and computing a group token to represent each group. The method continues with building a model tree using the group tokens, where each node of the tree represents an object model. In one such particular embodiment, the method further includes the preliminary step of receiving the plurality of training images including one or more objects, and formatting those images so that they can be processed according to the method. The method may include identifying objects in a target image using the model tree 7. In one such case, the method further includes the preliminary step of receiving the target images, and formatting those images so that they can be processed according to the method. In another such case, identifying objects in target images using the model tree includes computing one or more interest points in the target image, extracting tokens associated with the target image interest points, and comparing tokens of the target image with tokens in the model tree to identify matches. In response to determining a token match threshold is satisfied, the method may continue with outputting an object hypothesis. In response to determining a token match threshold is satisfied, the method may continue with rejecting the object hypothesis. The method may include repeating the computing, extracting, comparing, and determining for a plurality of target images (e.g., series of photographs or frames of video).

Another embodiment of the present invention provides a machine-readable medium (e.g., compact disk, diskette, server, or hard drive) encoded with instructions, that when executed by a processor, cause the processor to carry out a process for identifying objects in images. This process can be, for example, similar to or a variation of the previously described method.

Another embodiment of the present invention provides a system for identifying objects in images. The system includes an interest point locator module for computing one or more interest points in each of a plurality of training images including one or more objects, and a token extraction module for extracting tokens associated with the interest points. The system further includes a token grouping module for comparing tokens of training image pairs to find matched tokens, grouping the matched tokens into groups, and computing a group token to represent each group. The system also includes a model tree builder module for building a model tree using the group tokens, where each node of the tree represents an object model. The system may include a run-time recognition module for identifying objects in a target image using the model tree. In one such case, the run-time recognition module further includes an interest point locator module for computing one or more interest points in the target image, a token extraction module for extracting tokens associated with the target image interest points, and a token matching module for comparing tokens of the target image with tokens in the model tree to identify matches. The system may include a hypothesis verification module for determining if a token match threshold is satisfied, and outputting or rejecting an object hypothesis based on that determination. The system functionality can be implemented, for example, in software (e.g., executable instructions encoded on one or more computer-readable mediums), hardware (e.g., gate level logic or ASIC), or other suitable means.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1:
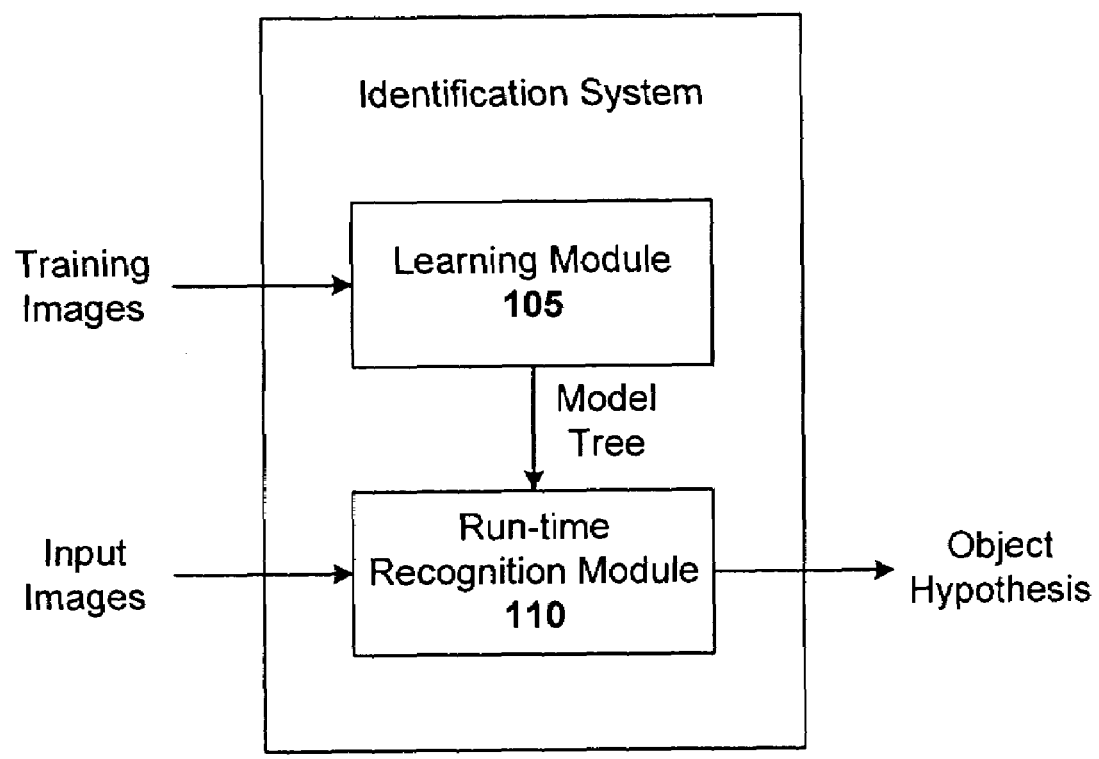
FIG. 1 shows an. identification system configured in accordance with one embodiment of the present invention.

Object recognition techniques are disclosed that provide both accuracy and speed. The techniques can be implemented without requiring a large database of training images, and enable real-time processing. Note, however, that embodiments of the present invention can also be used with a large database of training images, if so desired. Likewise, the present invention is not intended to be limited to applications that require real-time processing, and can readily be used in offline processing applications, as will be apparent.

General Overview

One embodiment of the present invention is an identification system. The system is capable of locating objects in images by searching for local features of an object. The system can operate in real-time (images are rapidly processed to achieve object hypotheses as the images are presented to the system), and can be used in applications such as autonomous driving, visual inspection for quality control, surveillance, autonomous robot navigation, and human-machine interfaces, to name a few.

The identification system is trained from a set of images of an object or objects. The object can be included in any type of scene, whether static (e.g., both system and objects are stationary) or dynamic (e.g., system and/or objects move, and/or objects are added/removed). The object can be finite (e.g., faces or body types, vehicles, circuits and other inspectable objects) or relatively continuous (e.g., roadways, hallways, and large rooms or other open areas). In short, the objects can be any entity that can be imaged and recognized based on characteristics in the image(s). In any case, the system first computes interest points in the training images, and then extracts local image features (referred to as tokens) around these interest points. Tokens (from two or more training images) that match are grouped, with each group being represented by a "group token" (e.g., mean of tokens in the group or simply the sole token in the group). These group tokens are then used to build a hierarchical model tree structure. Thus, unlike systems that build a separate model for each training image, an identification system configured in accordance with an embodiment of the present invention builds a hierarchical model tree structure using groupings of matched tokens across a set of training images. Such a hierarchy exploits similarities between objects shown in different training images, thereby enabling more accurate and reliable object hypothesis relative to currently known identification techniques.

During identification and detection, the identification system computes interest points from an incoming target image (or from a series of images). The system then attempts to match tokens around these interest points with the tokens in the hierarchical model tree. Each successfully matched image token votes for an object hypothesis at a certain scale, location, and orientation in the target image. In the hypothesis verification stage, object hypotheses that received only a small number of votes (e.g., below a preset threshold) by token, or no votes, are rejected.

The identification system can distinguish between "good" tokens (tokens which are robust against slight changes in the pose and/or in the illumination), and "bad" tokens (which are sensitive to those changes). Also, the system can evaluate how well a given token can separate between object and background. One particular embodiment implements a method for selecting a subset of the initial model tokens based on quality measures derived from a set of training images of objects and a set of background images.

System Architecture

FIG. 1 shows an identification system configured in accordance with one embodiment of the present invention. The system essentially has two modes of operation: learning mode and recognition/detection mode. Learning mode allows the system to be trained to recognize/detect the occurrence of a particular event or entity, while the recognition/detection mode allows the system to carry out the recognition/detection for which it was trained.

The system can be used in numerous applications, as will be apparent in light of this disclosure. For instance, the system can be used in an autonomous robot application, so as to give the robot capability to identify a person with whom the robot is interacting (or other entities with which the robot can interact or otherwise observe). The system can also be used as an inspection tool that ensures newly manufactured items (e.g., circuits) are properly assembled (e.g., based on a known good standard). The system can also be used as a person detection tool, which can determine if a particular individual is represented in an image (or set of images, such as surveillance video). The system can also be used in an autonomous driving application, so as to give a vehicle the capability to navigate a particular driving path (e.g., hallway or set of hallways, or roadway or set of roadways, leading from one location to another) without driver intervention.

As can be seen, the identification system includes a learning module 105 and a run-time recognition module 110. Training images are provided to the learning module 105, which then generates a model tree. Each node of the tree includes an object model. The specificity of the object model of each node increases as the hierarchal layers increase away from the root node. For instance, assume the system is for recognizing vehicles. In such a case, the root node may be an object model of a vehicle generally characterized by four wheels. This is the least specific object model in the hierarchy. The next layer in the model tree hierarchy may include one node that includes an object model for two-door vehicles and another node that includes an object model for four-door vehicles. Each of these nodes may then branch, for example, to three nodes that include further specific object models for sedans, pick-up trucks, and SUVs, respectively. Further layers of model tree hierarchy can be used for object models that represent additional specific features such as color, make, and model.

The training images can be, for example, a series of photographs or frames of video. In general, the training images include one or more objects (e.g., cars, people, circuits, room layouts, driving paths, or any other identifiable entity) that the system is intended to identify/detect. The training images can be input to the system, for example, by manually presenting each image to the learning module 105. In such an embodiment, the system may include, for example, a conventional image input mechanism for scanning or otherwise importing the images into digital format that can then be processed by the system. Alternatively, each training image can be automatically presented to the learning module 105. In one such embodiment, the identification system is configured with a user interface that allows a user to select a target object theme (e.g., automobiles or mug shots). The system can then access a database (e.g., commercial or custom) that stores digital training image sets relevant to the selected theme. Likewise, the system can access a service (e.g., Google Image Search, Yahoo Image Search, etc) that provides digital images from which a training image set relevant to a particular theme can be selected. Any number of mechanisms can be used to present the digital training images to the identification system, and the present invention is not intended to be limited to any particular one. The training carried out by the learning module can be performed by the manufacturer that builds the system, and/or by the end-user of the system (e.g., on an as needed basis). The learning module 105 and model tree are discussed in more detail with reference to FIGS. 2, 3a, and 3b.

The run-time recognition module 110 receives an input or target image(s), and attempts to match target image contents with one or more object models of the model tree (which is provided to module 110 by the learning module 105). As previously explained, each node in the tree represents an object model. The recognition starts with matching the target image to the root node of the model. Assuming there is a match at this general level, the matching process proceeds directly with the child nodes of the root node. If there is a match between the image and a given node, the matching process proceeds with the child nodes of the matched node, and so on. If the task is to identify a target object that is represented in the training set, the matching is continued until none of the child nodes has been successfully matched or until the end or "leaf" nodes of the tree have been reached. Any successful match with any of the leaf nodes leads to an object hypothesis (successful detection of the object). In a detection setting, where the task is to recognize objects (which have not necessarily been part of the training data) belonging to a certain class, a successful match with an intermediary node (i.e., not a leaf node) may also give rise to an object hypothesis.

In one embodiment, the identification system is deployed in an autonomous robot application trained to recognize and interact with people (in real-time) in a particular environment, such as a greeting room. In such a case, the system could be trained to generally recognize human faces (e.g., eyebrows, eyes, nose, and mouth) and/or the human form (e.g., body types and clothing styles), as well as the particular environment where the interaction will take place. The target images can be received, for example, from the "eyes" of the robot, such as a digital stereo camera or video camera operatively coupled to feed the run-time recognition module 110 (e.g., similar mechanism can be used to feed the learning module 105 during training). In another embodiment, the identification system can be used in a more static or offline application, such as surveillance video review. For instance, the system could be trained on mug shots of potential robbery suspects, and the target images provided to module 110 could be frames of surveillance video of a robbery (in effort to match the actual robber caught on video with a known suspect).

Note that multiple target images can be presented to the identification system, depending on the application. For instance, many frames of video can be presented to the system in an autonomous driving, surveillance, and robot navigation applications. The multiple frames can be presented one at a time, for rapid real-time processing. Alternatively, multiple frames can be presented in parallel for even faster real-time processing, assuming parallel processing capability is enabled. In one such configuration, the system configured with N run-time recognition modules 110, where N target images can be processed simultaneously. Note that each of the N recognition modules 110 can utilize the same learning module 105, or a dedicated learning module 105. The run-time recognition module 110 is discussed in more detail with reference to FIG. 4.

Learning Module

Figure 2:
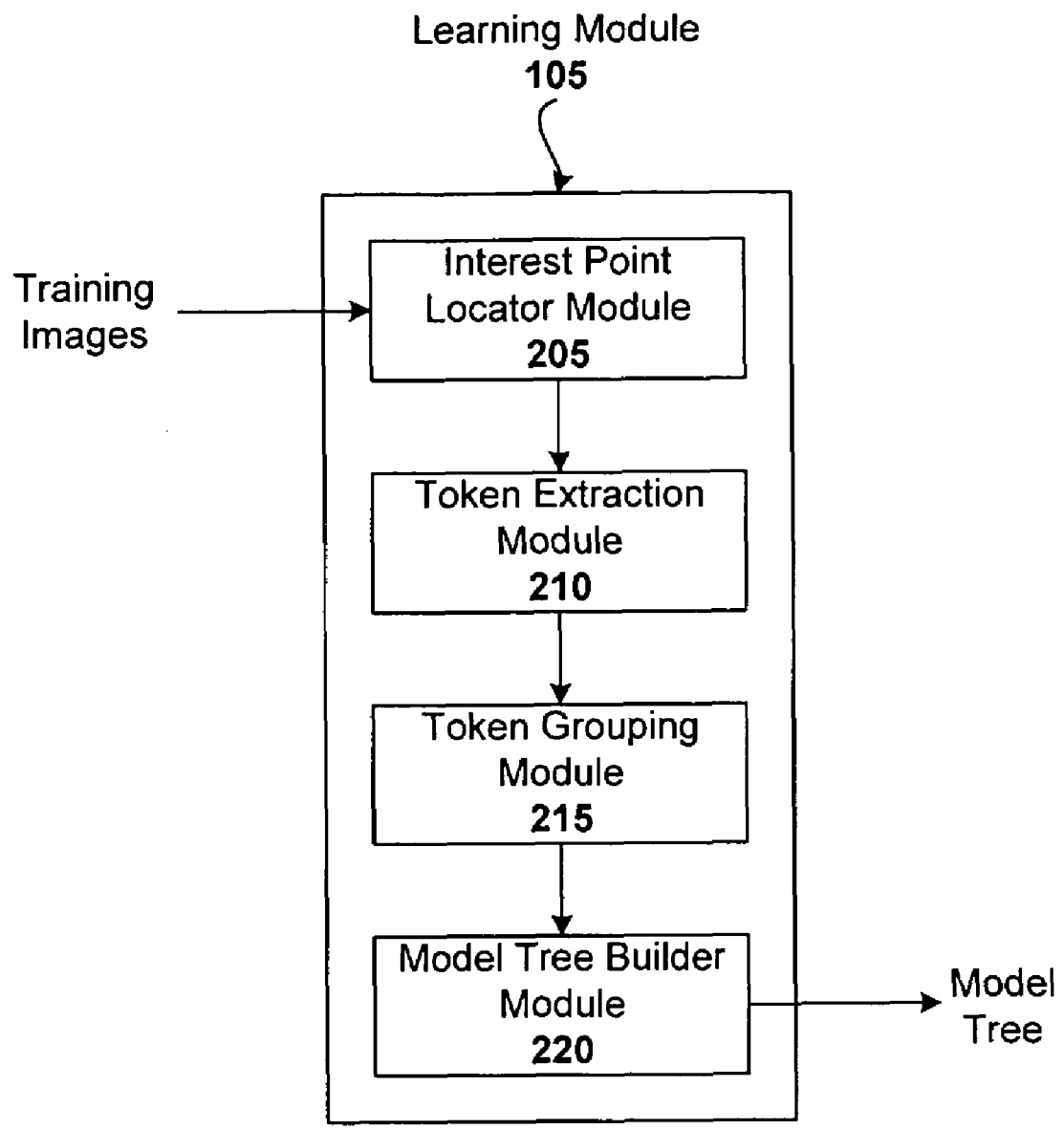
FIG. 2 shows a learning module of the identification system of FIG. 1, configured in accordance with one embodiment of the present invention.

FIG. 2 shows a learning module 105 of the identification system of FIG. 1, configured in accordance with one embodiment of the present invention. This module extracts data from training images shown to the system during training, and builds a model tree based on that extracted training image data. Although it is not a required for the present system, it is assumed that there are similarities in the appearance of the objects in different images. For example, the images can contain different views of the same object, or the images can contain different objects that belong to the same class, like cars.

As can be seen, the learning module 105 includes an interest point locator module 205, a token extraction module 210, a token grouping module 215, and a model tree builder module 220. Training images are received by module 105, which then generates a model tree. Each of these modules can be implemented, for example, in software (e.g., C, C++, or other suitable programming language), hardware (e.g., gate level logic or ASIC), firmware (e.g., microcontroller configured with I/O capability for receiving training images and a number of routines for carrying out interest point computation, token extraction, token grouping, and model tree building functions as described herein), or some combination thereof. In addition, note that the modules are shown as separate for purposes of illustration, and that other embodiments may have the various functionalities or sub-sets thereof integrated into a single module or parallel processing and/or pipelined architecture.

The interest point locator module 205 is programmed or otherwise configured to receive training images of one or more objects (e.g., cars, circuits, faces, body types, rooms, roadways, etc), and to compute one or more interest points in each of the training images received. In one particular embodiment, interest points are computed or otherwise located using a Harris corner detector. However, other embodiments may use other mechanisms for locating interest points, such as a Differential of Gaussian operator. The particular mechanism used will depend on particular factors such as the desired processing speed and reliability. Note that a Harris corner detector is generally faster and more reliable than other typical interest operators.

The extraction module 210 is programmed or otherwise configured to extract image features or "tokens" from pixel data around the computed interest points. This data extraction can be carried out using any number of known image data extraction techniques. In one particular embodiment, tokens are extracted from pixel data around the computed interest points using image data extraction techniques as described in the paper by David G. Lowe, titled "Distinctive Image Features from Scale-Invariant Keypoints," International Journal of Computer Vision, 60 (2), 2004, pp 91-110, which is herein incorporated in its entirety by reference. For example, tokens can be extracted from pixel data around the computed interest points as follows.

First, identify a target patch (e.g., such as a square patch of 23×23 pixels) around the interest point. Second, compute the main orientation of the patch using a histogram. For instance, compute the gradient at each pixel within the patch (which indicates the orientation of the gray value structure at this pixel) and index with the orientation (has to be discretized for this purpose) into an orientation histogram for the target patch. Increase the value of the indexed bin in the orientation histogram. The orientation corresponding to the orientation bin with the largest value in the histogram is chosen as the main orientation. Third, normalize according to the main orientation. For instance, take the patch and rotate it so that the new main orientation is 0 degrees. Fourth, compute the features of the token. For example, center a 16×16 pixel patch on the normalized (rotated) patch of 23×23 pixels, and subdivide it into sixteen 4×4 blocks. Then, compute an orientation histogram for each of these blocks (e.g., with 8 discrete orientations), as done when computing the main orientation. This example gives 16×8, or 128 features for the token. Many other known image feature extraction techniques can be used, as will be apparent in light of this disclosure.

The token grouping module 215 is programmed or otherwise configured to compare tokens of training image pairs to find matched tokens, and group the matched tokens into sets. Matching tokens in image pairs can be carried out by any number of suitable comparing/matching techniques. In one particular embodiment, the matching of individual tokens can be carried out as follows: Compute the distances between all pairs of tokens in two images. For a given token in the first image, take the smallest distance (i.e., the distance to the nearest neighbor token in the second image) and the second smallest distance (i.e., the distance to the second nearest neighbor token in the second image) and compute their ratio (e.g., $Distance_{smallest}/Distance_{2^{nd}smallest}$). If the ratio is below a certain threshold (e.g., 0.8), then accept the match (i.e., the token is matched to its nearest neighbor token). Otherwise, if threshold is not satisfied, then there is no match for the given token.

In any case, the matched tokens are then grouped into sets. In one particular embodiment, the token grouping module 215 is configured to only allow 1:1 correspondences between tokens in image pairs. Thus, a token in one image can be matched with only one token in another image. If a token is matched with a token that has already been matched to another token in a different image, the original cluster including the matched pair of tokens is extended to a triplet of matched tokens, and so on. Each group of matched tokens refers to a list of images, which is matched by that particular group. As previously explained, each group is represented by a "group token," which can be computed as the mean of the tokens (average token) in a group. Other embodiments may use the median token as the group token, or some other suitable statistical representation of the group. If a token did not match with any of the other tokens, then it gets assigned to its own group. Note that finding individual tokens that match across several images does not automatically mean they can be grouped together into a group token. Rather, the matches should be consistent with regard to orientation, scale, and position. Thus, matches can be processed through a consistency check. In particular, each match of an individual token gives rise to an object hypothesis (object at certain scale, location and orientation). Therefore, if tokens in multiple images are grouped into a group token, the tokens should agree on the object hypothesis (which can be verified for each individual token in the group of matched tokens using conventional or custom techniques). In one particular case, the Hough transform is used to check if matching tokens in two images are consistent with respect to scale, orientation, and position of the matched tokens. Other techniques for carrying out this consistency check will be apparent in light of this disclosure.

The model tree builder module 220 is programmed or otherwise configured to use the group tokens computed by the token grouping module 215 to build a model tree of the object. The tree contains a set of nodes, each of which represents an object model. Each node contains a set of matched tokens (referred to herein as matched node tokens), a list of training images (referred to herein as node images), and a list of group tokens (referred to herein as node tokens). Each of the node tokens references at least one of the node images and it cannot be a member of the matched node token list. Each node can have zero, one, or several child nodes. If a node has zero child nodes, it is called a leaf node. Each node has exactly one parent node, except for the root node, which doesn't have a parent node.

In one particular embodiment, a model tree building algorithm is applied to each node in the tree to create child nodes and build the model tree one node at a time, and one hierarchal layer at a time. Initially, the tree is started with a root node that contains a set of all the training images, an empty set of matched node tokens, and a list of all the node tokens. Recall that a node token (or "group token") represents a group of tokens matched across a set of training images. The algorithm is applied once to each node. When the algorithm is applied to a certain node, that node is referred to as a parent node. The model tree building algorithm generally includes three Steps: A, B, and C, each of which will now be described.

Step A: From the set of parent node tokens, identify the subset of node tokens that has the most common matches amongst the parent node images. If two subsets have the same number of common matches, the subset that is larger (with regard to the number of tokens) can be picked. For example, assume one subset of node tokens includes tokens B and C, each of which matches images 1, 2, and 3, and another subset includes token A, which matches images 2, 3, and 4. Here, there are two subsets (one subset includes B and C, and the other includes A) that have the same number of common image matches (three matches per subset). In this example case, one of the subsets has two tokens (B and C), while the other subset only has one token (A). Thus, the subset including tokens B and C would be selected. In the case where two subsets match the same number of images and have the same number of tokens, then one subset can be picked randomly. Note that a "set" and "subset" of tokens may include one or more tokens.

Step B: Build a new child node that has a set of matched node tokens that includes the subset identified in Step A combined with the parent's matched node tokens. In addition, the child node being built inherits the subset of parent node images that are matched with its (the child's) matched node token set. These images will be the node images of the child node. The child node also inherits all the parent node tokens connected to these node images. However, this inherited set of node tokens does not include the tokens in the matched node token set of that child. The inherited node tokens will be the node tokens of the child node.

Step C: Remove from the parent node the node images that are matched by the newly created child node and repeat Steps A, B, and C to create another child node (at the same level of the tree), and so on, until no more node images are left in the parent node. If a node has an empty list of node tokens, then it is a leaf node.

Figure 3A:
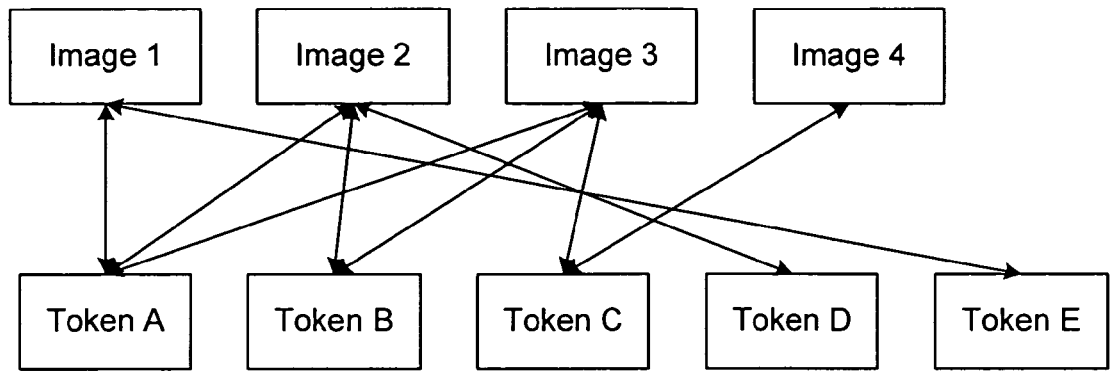
FIG. 3a shows training images and token sets extracted therefrom, in accordance with one embodiment of the present invention.
Figure 3B:
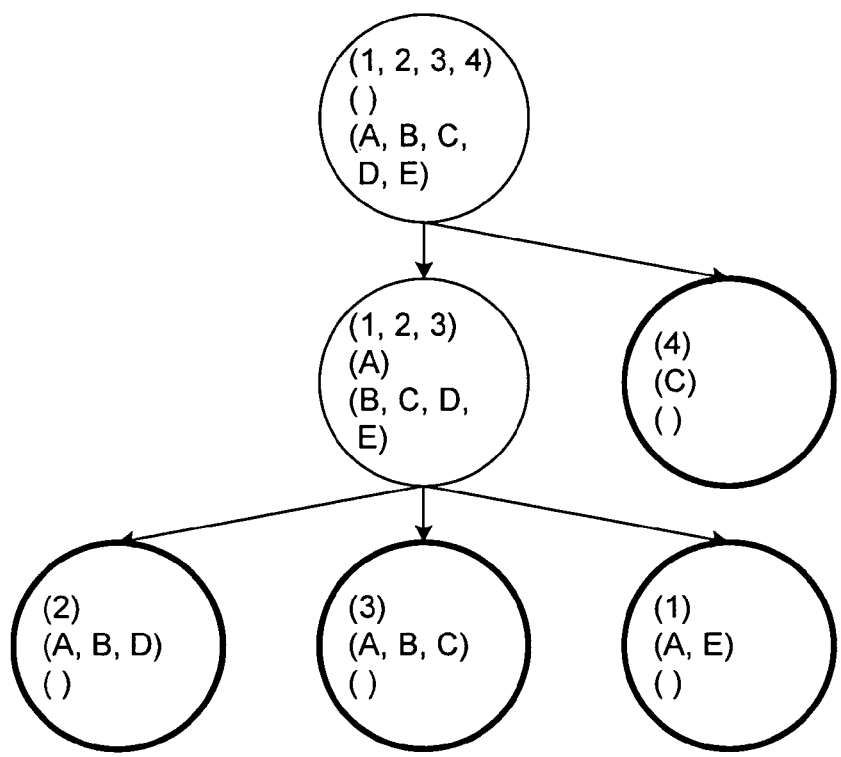
FIG. 3b shows a model tree configured from the token set of FIG. 3a in accordance with one embodiment of the present invention.

The model tree building process implemented by the model tree builder module 220, in accordance with one embodiment of the present invention, is illustrated in FIGS. 3*a* and 3*b*. As can be seen, the example includes four training images and five group tokens. FIG. 3*a* shows the relationship between the training images and the group tokens (e.g., as established by the collective operation of the interest point locator module 205, the token extraction module 210, and the token grouping module 215). In particular, group token A matches images 1, 2, and 3 (group token A is a statistical representation of the three matched tokens taken from images 1, 2, and 3, respectively). Likewise, group token B matches images 2 and 3 (group token B is a statistical representation of the two matched tokens taken from images 2 and 3, respectively). Likewise, group token C matches images 3 and 4 (group token C is a statistical representation of the two matched tokens taken from images 3 and 4, respectively). Likewise, group token D matches image 2 (group token D can be represented by token D itself, since it was not matched with other tokens). Likewise, group token E matches image 1 (group token E can be represented by token E itself, since it was not matched with other tokens). In one embodiment, and as previously explained, the statistical representation is the computed mean of tokens in the group. Note that a token can be represented mathematically, for instance, as a vector or array (as typically done), and can therefore be averaged or otherwise used in computing a group token.

The model tree builder module 220 then builds the model tree shown in FIG. 3*b*, using the group tokens and relationships depicted in FIG. 3*a*. The three expressions in parentheses inside each node of the model tree shown in FIG. 3*b* represent from top to bottom: the node images, the matched node tokens, and the node tokens. The leaf nodes of the tree are drawn in bold circles.

The root node of the tree shown in FIG. 3*b* contains all four images as its set of node images (1, 2, 3, 4), an empty set of matched node tokens ( ), and all five tokens as its set of node tokens (A, B, C, D, E). According to Step A of the tree building process, the set or sets of node tokens that matches the largest number of training images is identified. In this particular example, this set includes only one token (token A), which matches with three training images (images 1, 2, and 3). A new child node is then built according to Step B of the tree building process. In particular, and with reference to FIGS. 3*a* and 3*b*, this new child node includes token A as its matched node token. In addition, this new child node inherits training images 1, 2 and 3 as its node images, tokens B, C, D, and E as its node tokens, also per Step B.

A second new child node is then built according to Step C of the tree building process (which involves repeating Steps A, B, and C). In more detail, the matched node images (which in this example are images 1, 2, and 3) are removed from the current parent node, such that only image 4 remains. Steps A, B, and C are then repeated on the modified parent node (which for purposes of computing this second new child node now includes a node image 4, an empty set of matched node tokens, and node tokens A, B, C, D, and E). In accordance with Step A, the subset of the parent node tokens that has the most common matches amongst the parent node images includes token C (which is the only token associated with image 4 in this example). Continuing with Step B, the second new child node is built to have a set of matched node tokens that includes the subset identified in Step A (which is token C in this example) combined with the parent's matched node tokens (of which there are none). Thus, the set of matched node tokens of this second new child node includes token C only. In addition, this second new child node inherits the subset of parent node images that are matched with its (the child's) matched node token set (which in this example is image 4, the only parent node image left). This image 4 is the node image of the second new child node. The second new child node also inherits all the parent node tokens connected to these node images, except those tokens included in the matched node token set of that child. These inherited node tokens (which include an empty set) are the node tokens of the second new child node. Thus, this second new child node is a leaf node (as indicated by the bold circle). Applying Step C removes the last node image (image 4) in the parent node, so the process terminates for this layer of the model tree hierarchy.

After the child nodes of the root node are created, the same algorithm is applied to the newly created nodes, by the model tree builder module 220. In particular, Steps A, B, and C are applied to each non-leaf node of the last hierarchy layer. In this example, therefore, the next parent node is the node that includes: node images 1, 2, and 3; matched node token A; and node tokens B, C, D, and E. In more detail, and according to Step A of the tree building process, each of node tokens B and C are identified as matching the largest number of training images (token B matches images 2 and 3, and token C matches images 3 and 4; other tokens D and E only match one image each). Step B is then applied to build a new child node that has a set of matched node tokens that includes the subset identified in Step A (tokens B and C) combined with the parent's matched node tokens (token A). In addition, the child node being built inherits the subset of parent node images that are matched with its (the child's) matched node token set (which in this case is image 3, the only image matched with both tokens B and C). This image 3 is the node images of the child node. The child node also inherits all the parent node tokens connected to these node images (not including the tokens in the matched node token set of that child). These inherited node tokens include an empty set for this child node (which is a leaf node, as indicated by the bold circle). Continuing with Step C, the node images that are matched by the newly created child node are removed, and repeat Steps A, B, and C are repeated to create another child node (at the same level of the tree), and so on, until no more node images are left in the parent node. In this example, there are two more child nodes in this third and last level of the model tree hierarchy.

In further detail, and according to Step C of the tree building process, the matched node images (which in this example is image 3 only) are removed from the current parent node, such that only images 1 and 2 remain. Steps A, B, and C are then repeated on the modified parent node (which for purposes of computing this second new child node now includes node images 1 and 2, a matched node token A, and node tokens B, C, D, and E). In accordance with Step A, the subset of the parent node tokens that has the most common matches amongst the parent node images 1 and 2 includes node tokens B and D (each of which are associated with image 2 in this example; node token E is only associated with image 1, and node token C is not associated with either of images 1 or 2). Continuing with Step B, the second new child node is built to have a set of matched node tokens that includes the subset identified in Step A (which includes tokens B and D in this example) combined with the parent's matched node tokens (token A). Thus, the set of matched node tokens of this second new child node includes tokens A, B, and D. In addition, this second new child node inherits the subset of parent node images that are matched with its (the child's) matched node token set (which in this example is image 2). This image 2 is the node image of the second new child node for the third layer of tree hierarchy. This second new child node also inherits all the parent node tokens connected to these node images, except those tokens included in the matched node token set of that child. These inherited node tokens (which include an empty set) are the node tokens of the second new child node. Thus, this second new child node is a leaf node (as indicated by the bold circle). Continuing with Step C, the node images that are matched by the second new child node are removed, and repeat Steps A, B, and C are repeated to create a third new child node (at the same level of the tree).

In further detail, and according to Step C of the tree building process, the matched node images (which in this example is image 2 only) are removed from the current parent node, such that only image 1 now remains. Steps A, B, and C are then repeated on the modified parent node (which for purposes of computing this third new child node now includes node image 1, a matched node token A, and node tokens B, C, D, and E). In accordance with Step A, the subset of the parent node tokens that has the most common matches amongst the parent node image 1 includes token E (which is the only node token of the parent associated with image 1 in this example; node tokens B, C, and D are not associated with image 1). Continuing with Step B, the third new child node is built to have a set of matched node tokens that includes the subset identified in Step A (which includes token E in this example) combined with the parent's matched node tokens (token A). Thus, the set of matched node tokens of this third new child node includes tokens A and E. In addition, this third new child node inherits the subset of parent node images that are matched with its (the child's) matched node token set (which in this example is image 1). This image 1 is the node image of the third new child node for the third layer of tree hierarchy. This third new child node also inherits all the parent node tokens connected to node image 1, except those tokens included in the matched node token set of that child. These inherited node tokens (which include an empty set) are the node tokens of the second new child node. Thus, this third new child node is a leaf node (as indicated by the bold circle). Applying Step C removes the last node image (image 1) in the parent node, so the process terminates for this third layer of the model tree hierarchy.

As will be appreciated in light of this disclosure, the model tree may include any number of hierarchy layers depending on the given application, and the present invention is not intended to be limited to any one particular implementation. The model tree building algorithm can be applied to create each level of child nodes as described herein, until a layer of the hierarchy is achieved that includes only leaf nodes.

Run-time Recognition Module

Figure 4:
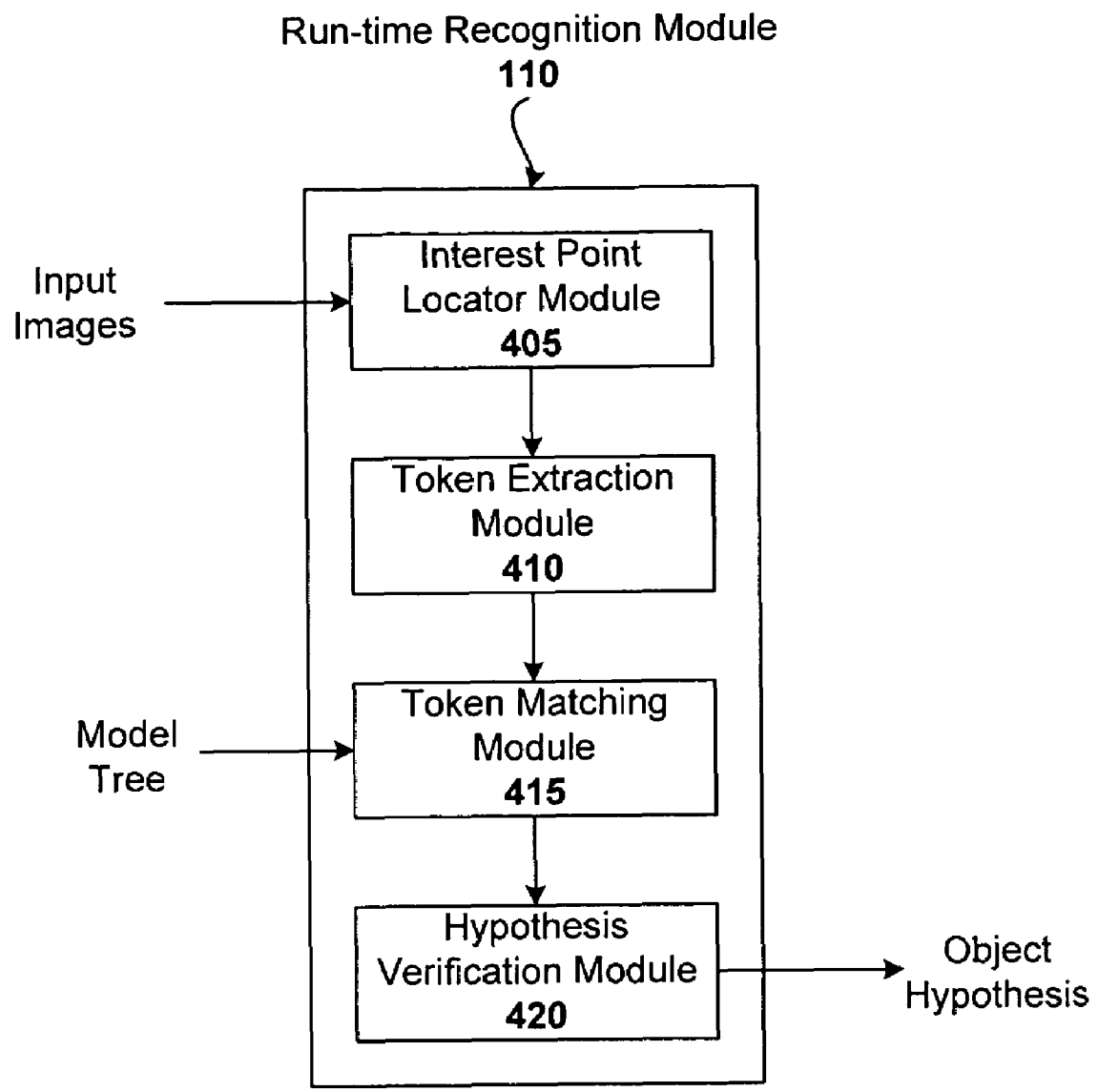
FIG. 4 shows a run-time recognition module of the identification system of FIG. 1, configured in accordance with one embodiment of the present invention.

FIG. 4 shows a run-time recognition module 110 of the identification system of FIG. 1, configured in accordance with one embodiment of the present invention. This module 110 matches the contents of target images with the model tree computed by the learning module 105.

As can be seen, the learning module 110 includes an interest point locator module 405, a token extraction module 410, a token matching module 415, and a hypothesis verification module 420. Input or "target" images are received by module 105, from which tokens are extracted. The module 110 then attempt to match these tokens with the model tree. Each of these modules can be implemented, for example, in software (e.g., C, C++, or other suitable programming language), hardware (e.g., gate level logic or ASIC), firmware (e.g., microcontroller configured with I/O capability for receiving target images and a number of routines for carrying out interest point computation, token extraction, token matching to model tree, and hypothesis verification functions as described herein), or some combination thereof. In addition, note that the modules are shown as separate for purposes of illustration, and that other embodiments may have the various functionalities or sub-sets thereof integrated into a single module or parallel processing and/or pipelined architecture.

The interest point locator module 405 is programmed or otherwise configured to receive target images for analysis, and to compute one or more interest points in target images received. This interest point locator module 405 can be implemented in a similar fashion to the interest point locator module 205 discussed with reference to FIG. 2, with that discussion being equally applicable here. The extraction module 410 is programmed or otherwise configured to extract image features or "tokens" from pixel data around the computed interest points. This extraction module 410 can be implemented in a similar fashion to the extraction module 210 discussed with reference to FIG. 2, with that discussion being equally applicable here. In one particular embodiment, the interest point locator modules 205 and 405 are implemented as a single module (to avoid redundancy). Likewise, the extraction modules 210 and 410 can be implemented as a single module if so desired.

The token matching module 415 is programmed or otherwise configured to compare tokens of target image with tokens in the model tree. As previously explained, each node in the tree represents an object model. The token matching module 415 begins with matching the image to the root node of the model. The root node does not contain any matched node tokens. Therefore the matching performed by the token matching module 415 proceeds directly with the child nodes of the root node. The matching performed here (e.g., comparing and matching two tokens, one from the target image and one from the model tree) can be implemented in a similar fashion as the matching performed by the token grouping module 215, with that discussion equally applicable here. A check can also be carried out, to confirm consistency with respect to scale, orientation and position of the matched tokens, as previously discussed with reference to the token grouping module 215. If there is a match between the image and a given node of the model tree, then the matching performed by the token matching module 415 proceeds with the child nodes of the matched node. If the task is to identify an object that has been part of the training image set, the matching is continued until none of the child nodes has been successfully matched or until the leaf nodes of the tree have been reached. Again, note that similar functionalities (e.g., token matching and consistency checks) of the learning module 105 and recognition module 110 can be combined into a single module, if so desired. The modules are shown separate for purposes of illustration and to facilitate understanding.

As previously explained, each successfully matched image token votes for an object hypothesis at a certain scale, location, and orientation in the target image. The hypothesis verification module 420 is programmed or otherwise configured to determine if a token match threshold is satisfied. In one particular embodiment, a valid hypothesis is obtained if a minimum number of tokens matched and voted for the same object hypothesis. This minimum number (or threshold) depends on the number of node tokens in a given node (object model), and the desired accuracy of the match. If the threshold is satisfied, then the hypothesis verification module 420 outputs an object hypothesis (successful detection of the object). Otherwise, the hypothesis verification module 420 rejects the object hypothesis. In such a case, the identification system can repeat the identification process, or simply ignore that particular target. The identification system may also inform the user (e.g., via a display or verbal output) that object identification for that particular image was indeterminate, if so desired. In a detection application, where the task is to recognize objects (which have not necessarily been part of the training data) belonging to a certain class, a successful match with an intermediary node (i.e., not a leaf node) might be sufficient to give rise to an object hypothesis. For example, if the root node characterizes a general class of vehicles with four wheels, and each of the leaf nodes is a specific vehicle make and model, then a successful match with an intermediary node would justify a general object hypothesis that the target image includes a vehicle, and possibly the number of doors and body style (depending on the specificity of the intermediary nodes).

Methodology

Figure 5A:
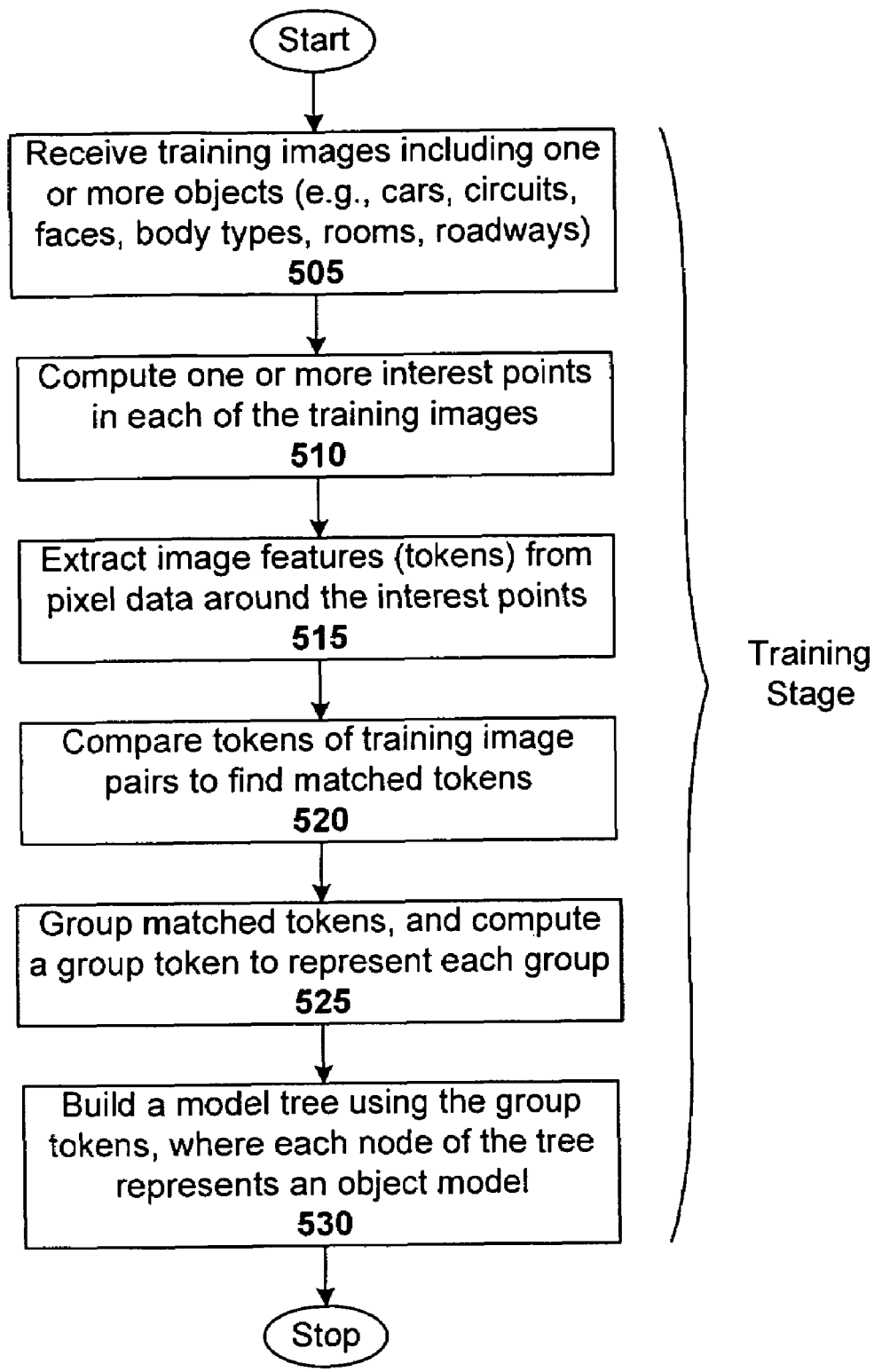
FIG. 5a illustrates a method for training an identification system, in accordance with one embodiment of the present invention.

FIG. 5a illustrates a method for training an identification system, in accordance with one embodiment of the present invention. The method can be carried out, for example, by the learning module 105 of FIGS. 1, 2, 3a, 3b, and the related description is equally applicable here.

The method begins with receiving 505 training images including one or more objects (e.g., cars, circuits, faces, body types, rooms, roadways). Note that the method may further include formatting those images so that they can be processed according to the method (e.g., converting the images to a particular desired digital format, such as JPEG or PNG, or converting hard-copy images into digital format). The method continues with computing 510 one or more interest points in each of the training images (e.g., using Harris corner detector), and extracting 515 image features (tokens) from pixel data around the interest points.

The method continues with comparing 520 tokens of training image pairs to find matched tokens. Recall that tokens from two or more images can match. Further recall that some tokens will not match any other tokens. The method continues with grouping 525 the matched tokens, and computing a group token to represent each group (e.g., such as an average or mean token representative of the group). In cases where there is only one token in a group (i.e., no other tokens matched), then the token itself can be used to represent the "group."

The method proceeds with building 530 a model tree using the group tokens, where each node of the tree represents an object model. In one particular embodiment, the object model of each node includes a set of node images, a set of matched node tokens, and a set of node tokens. Note that a "set" as used herein can be empty (e.g., such as an empty set of node images, or an empty set of matched node tokens), or include one or more items (whether images or tokens). As previously explained with reference to FIGS. 2, 3a, and 3b, a model tree generation algorithm including Steps A, B, and C can be applied to each node to generate the tree, in accordance with one particular embodiment.

Figure 5B:
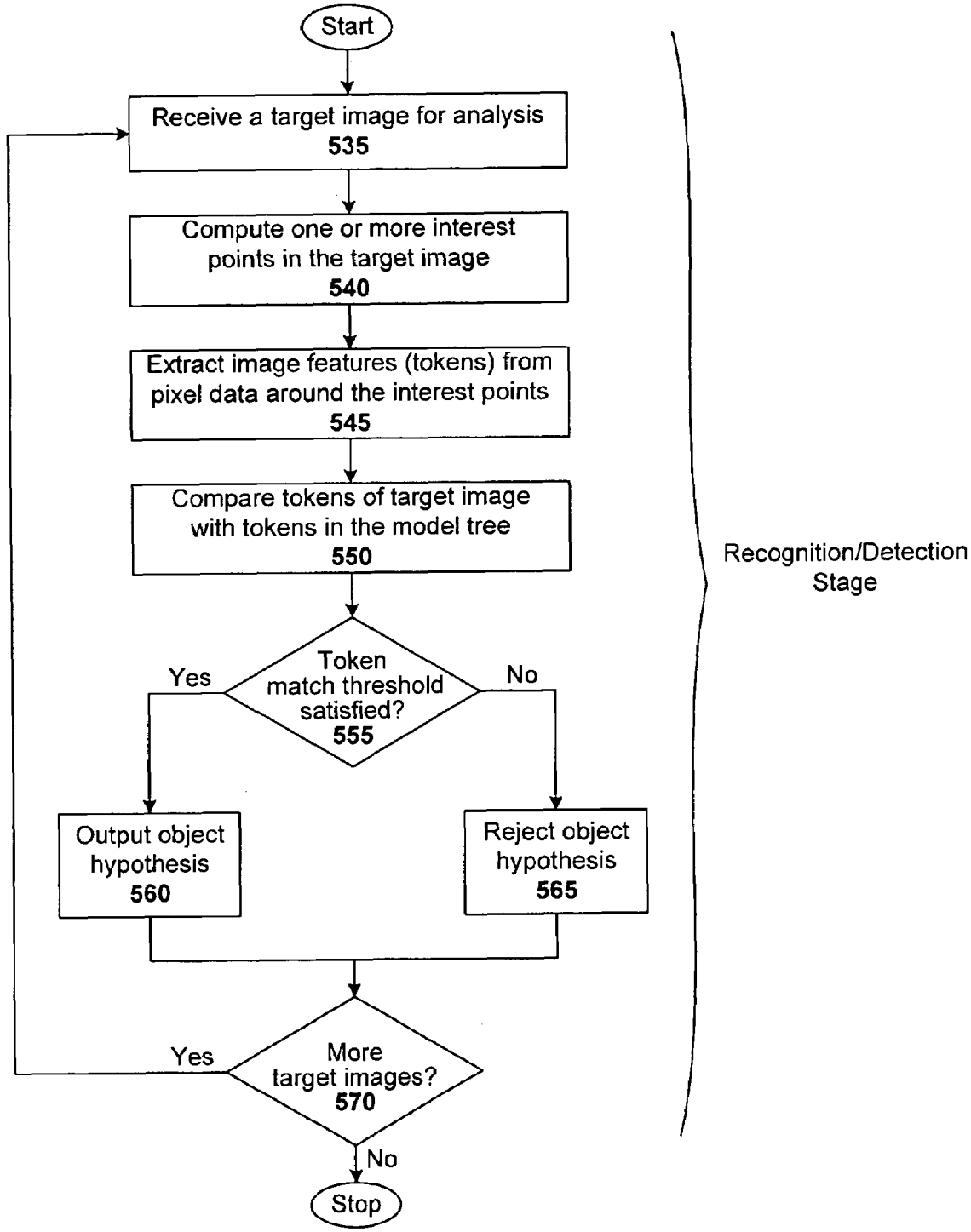
FIG. 5b illustrates a method for recognizing/detecting objects in images using the trained identification system, in accordance with one embodiment of the present invention.

FIG. 5b illustrates a method for recognizing/detecting objects in images using the trained identification system, in accordance with one embodiment of the present invention. The method can be carried out, for example, by the run-time recognition module 110 of FIGS. 1 and 4, and the related description is equally applicable here.

The method begins with receiving 535 a target image for analysis. In general, the target images include objects that are generally related to objects in the training images. For example, the objects in the target images can be of the same class (e.g., cars of the same make and model, or circuits) or a similar class (e.g., four wheel vehicles in general, or people in general) as object in the training images. Also, note that the method may further include formatting those images so that they can be processed according to the method (as previously discussed with reference to FIG. 5a and received training images).

In any case, the method continues with computing 540 one or more interest points in the target image, and extracting 545 image feature (tokens) from pixel data around the interest points. The method continues with comparing 550 tokens of the target image with tokens in the model tree to identify matches. The method proceeds with determining 555 if a token match threshold satisfied. If so, the method continues with outputting 560 an object hypothesis. Otherwise, the method continues with rejecting 565 the object hypothesis. The method continues with determining 570 if there a more target images to process (e.g., such as the case with a video have multiple frames to be analyzed). If so the method repeats; otherwise, the method terminates.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-implemented method for identifying objects in images, wherein the method is performed by a processor, comprising:
   computing one or more interest points in each of a plurality of training images including one or more objects, wherein each interest point represents one pixel, and wherein the one or more interest points in a training image represent a subset of the pixels of the training image;
   extracting tokens associated with the interest points, wherein a token associated with an interest point comprises an image feature of an image region surrounding the interest point;
   comparing tokens associated with an interest point in a first training image with tokens associated with an interest point in a second training image to find matched tokens, wherein a matched token comprises a first token in the first training image and a second token in the second training image, and wherein the first token is related to the second token;
   grouping the matched tokens into sets, wherein a set comprises related matched tokens;
   computing a group token to represent each set of matched tokens; and
   creating a model tree using the group tokens, where each node of the tree represents an object model for identifying objects in images.

2. The method of claim 1 wherein the method further includes the preliminary step of receiving the plurality of training images including one or more objects, and formatting those images so that they can be processed according to the method.

3. The method of claim 1 further comprising:
   identifying objects in a target image using the model tree.

4. The method of claim 3 wherein identifying objects in the target image using the model tree comprises:
   computing one or more interest points in the target image;
   extracting tokens associated with the target image interest points; and
   comparing tokens of the target image with tokens in the model tree to identify matches.

5. The method of claim 4 further comprising:
   in response to determining that a token match threshold is satisfied, accepting an object hypothesis; and
   in response to determining that a token match threshold is not satisfied, rejecting an object hypothesis.

6. The method of claim 5 further comprising:
   repeating the computing, extracting, comparing, and determining for a plurality of target images.

7. The method of claim 3 wherein the method further includes the preliminary step of receiving the target image, and formatting the target image so that it can be processed according to the method.

8. A machine-readable medium encoded with instructions, that when executed by a processor, cause the processor to carry out a process for identifying objects in images, comprising:

computing one or more interest points in each of a plurality of training images including one or more objects, wherein each interest point represents one pixel, and wherein the one or more interest points in a training image represent a subset of the pixels of the training image;

extracting tokens associated with the interest points, wherein a token associated with an interest point comprises an image feature of an image region surrounding the interest point;

comparing tokens associated with an interest point in a first training image with tokens associated with an interest point in a second training image to find matched tokens, wherein a matched token comprises a first token in the first training image and a second token in the second training image, and wherein the first token is related to the second token;

grouping the matched tokens into sets, wherein a set comprises related matched tokens;

computing a group token to represent each set of matched tokens; and creating a model tree using the group tokens, where each node of the tree represents an object model for identifying objects in images.

9. The machine-readable medium of claim 8 wherein the process further includes receiving the plurality of training images including one or more objects, and formatting those images so that they can be processed according to the process.

10. The machine-readable medium of claim 8, the process further comprising:

identifying objects in a target image using the model tree.

11. The machine-readable medium of claim 10 wherein identifying objects in the target image using the model tree comprises:

computing one or more interest points in the target image;
extracting tokens associated with the target image interest points; and
comparing tokens of the target image with tokens in the model tree to identify matches.

12. The machine-readable medium of claim 11, the process further comprising:

in response to determining that a token match threshold is satisfied, accepting an object hypothesis; and
in response to determining that a token match threshold is not satisfied, rejecting an object hypothesis.

13. The machine-readable medium of claim 12, the process further comprising:

repeating the computing, extracting, comparing, and determining for a plurality of target images.

14. The machine-readable medium of claim 10 wherein the process further includes the preliminary step of receiving the target image, and formatting the target image so that it can be processed according to the process.

15. A hardware system for identifying objects in images, comprising:

an interest point locator module for computing one or more interest points in each of a plurality of training images including one or more objects, wherein each interest point represents one pixel, and wherein the one or more interest points in a training image represent a subset of the pixels of the training image;

a token extraction module for extracting tokens associated with the interest points, wherein a token associated with an interest point comprises an image feature of an image region surrounding the interest point;

a token grouping module for comparing tokens associated with an interest point in a first training image with tokens associated with an interest point in a second training image to find matched tokens, wherein a matched token comprises a first token in the first training image and a second token in the second training image, and wherein the first token is related to the second token, for grouping the matched tokens into sets, wherein a set comprises related matched tokens, and for computing a group token to represent each set of matched tokens; and a model tree creator module for creating a model tree using the group tokens, where each node of the tree represents an object model for identifying objects in images.

16. The system of claim 15 further comprising:
a run-time recognition module for identifying objects in a target image using the model tree.

17. The system of claim 16 wherein the run-time recognition module further comprises:

an interest point locator module for computing one or more interest points in the target image;
a token extraction module for extracting tokens associated with the target image interest points; and
a token matching module for comparing tokens of the target image with tokens in the model tree to identify matches.

18. The system of claim 17 further comprising:
a hypothesis verification module for determining if a token match threshold is satisfied, and accepting an object hypothesis or rejecting an object hypothesis based on that determination.

19. A hardware system for identifying objects in images, comprising:

a means for computing one or more interest points in each of a plurality of training images including one or more objects, wherein each interest point represents one pixel, and wherein the one or more interest points in a training image represent a subset of the pixels of the training image;

a means for extracting tokens associated with the interest points, wherein a token associated with an interest point comprises an image feature of an image region surrounding the interest point;

a means for comparing tokens associated with an interest point in a first training image with tokens associate with an interest point in a second training image to find matched tokens, wherein a matched token comprises a first token in the first training image and a second token in the second training image, and wherein the first token is related to the second token, for grouping the matched tokens into sets, wherein a set comprises related matched tokens, and for computing a group token to represent each set of matched tokens; and a means for creating a model tree using the group tokens, where each node of the tree represents an object model for identifying objects in images.

20. The system of claim 19 further comprising:
a means for computing one or more interest points in a target image;
a means for extracting tokens associated with the target image interest points; and
a means for comparing tokens of the target image with tokens in the model tree to identify matches; and
a means for determining if a token match threshold is satisfied, and accepting an object hypothesis or rejecting an object hypothesis based on that determination.

* * * * *